(12) United States Patent
Chen (10) Patent No.: US 8,965,036 B2
(45) Date of Patent: Feb. 24, 2015

(54) METHOD AND SYSTEM FOR SUPPORTING WATERMARK EMBEDDING IN MULTIMEDIA SYSTEM-ON-CHIPS

(75) Inventor: Xuemin Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/196,055

(22) Filed: Aug. 2, 2011

(65) Prior Publication Data

US 2011/0283102 A1 Nov. 17, 2011

Related U.S. Application Data

(63) Continuation of application No. 11/683,841, filed on Mar. 8, 2007, now Pat. No. 8,000,493.

(51) Int. Cl.
*G06K 9/00* (2006.01)
*G06F 21/10* (2013.01)
(Continued)

(52) U.S. Cl.
CPC .............. *G06F 21/10* (2013.01); *G06T 1/0021* (2013.01); *H04N 5/913* (2013.01); *H04N 21/235* (2013.01); *H04N 21/23892* (2013.01); *H04N 21/2541* (2013.01); *H04N 21/435* (2013.01);
(Continued)

(58) Field of Classification Search
USPC ........................................................ 382/100
See application file for complete search history.

(56) References Cited

U.S. PATENT DOCUMENTS 5,703,950 A * 12/1997 Jovanovich et al. .......... 380/249
6,026,165 A * 2/2000 Marino et al. ................ 380/273
(Continued)

FOREIGN PATENT DOCUMENTS

| EP | 1009126 A1 * | 6/2000 | ............... H04L 9/32 |
| EP | 1406446 | 4/2004 | |
| EP | 2006108181 | 10/2006 | |

OTHER PUBLICATIONS

European Search Report correspondence to European Patent Application Serial No. 08000500.2-2415, dated Jul. 23, 2008, 4 pages.
(Continued)

*Primary Examiner* — Tom Y Lu
(74) *Attorney, Agent, or Firm* — Sterne Kessler Goldstein & Fox P.L.L.C.

(57) ABSTRACT

A secure server may be utilized to support watermark embedding in multimedia system-on-chips, by generating an encrypted and signed watermarking signal for use in each particular system-on-chip. The encrypted and signed watermarking signal is generated based on a unique per-chip ID associated with the particular system-on-chip. The watermarking signal may be signed by the secure server utilizing a random number generated in and/or provided by the particular system-on-chip. The watermarking signal may be encrypted by the secure server based on a secret encryption key associated with the particular system-on-chip. The secret encryption key may be determined based on the unique per-chip ID associated with the particular system-on-chip. The secure server may store information, received from various system-on-chips, for use during generation of watermarking signals. The information received from each system-on-chip may comprise corresponding unique per-chip ID and/or a random number associated with each particular system-on-chip.

20 Claims, 9 Drawing Sheets

(51) Int. Cl.
*G06T 1/00* (2006.01)
*H04N 5/913* (2006.01)
*H04N 21/235* (2011.01)
*H04N 21/2389* (2011.01)
*H04N 21/254* (2011.01)
*H04N 21/435* (2011.01)
*H04N 21/6334* (2011.01)
*H04N 21/835* (2011.01)
*H04N 21/8358* (2011.01)
*H04L 9/32* (2006.01)

(52) U.S. Cl.
CPC ....... *H04N21/63345* (2013.01); *H04N 21/835* (2013.01); *H04N 21/8358* (2013.01); *H04L 9/3247* (2013.01); *G06F 2221/0733* (2013.01); *G06F 2221/0753* (2013.01); *G06T 2200/28* (2013.01); *H04N 2005/91335* (2013.01); *H04L 2209/608* (2013.01)
USPC .......................................................... 382/100

(56) References Cited

U.S. PATENT DOCUMENTS

| | | | |
|---|---|---|---|
| 6,282,650 | B1 | 8/2001 | Davis |
| 7,062,069 | B2* | 6/2006 | Rhoads .......................... 382/100 |
| 7,159,116 | B2* | 1/2007 | Moskowitz .................... 713/176 |
| 7,487,128 | B2 | 2/2009 | Spagna et al. |
| 7,657,056 | B2 | 2/2010 | Kwon et al. |
| 8,000,493 | B2 | 8/2011 | Chen |
| 2003/0228015 | A1* | 12/2003 | Futa et al. ..................... 380/201 |
| 2004/0064689 | A1 | 4/2004 | Carr |
| 2005/0065799 | A1* | 3/2005 | Dare et al. ........................ 705/1 |
| 2005/0182948 | A1 | 8/2005 | Ducharme |

OTHER PUBLICATIONS

Voyatzis et al., "The Use of Watermarks in the Protection of Digital Multimedia Products," Jul. 1, 1999, Proceedings of the IEEE, IEEE. New York, pp. 1197-1206.

* cited by examiner

FIG. 8

METHOD AND SYSTEM FOR SUPPORTING WATERMARK EMBEDDING IN MULTIMEDIA SYSTEM-ON-CHIPS

CROSS-REFERENCE TO RELATED APPLICATIONS/INCORPORATION BY REFERENCE

This application is a continuation of U.S. patent application Ser. No. 11/683,841, filed on Mar. 8, 2007.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to digital media processing. More specifically, certain embodiments of the invention relate to a method and system for watermark embedding in a multimedia system-on-chip.

BACKGROUND OF THE INVENTION

Watermarking is a technique utilized to protect digital media from unauthorized use or illegal copying, such as with copyrighted material, for example. Watermarking of digital media may fall into two categories: visible or invisible. Visible watermarks are typically added to digital images to indicate ownership and to thwart unauthorized use of the images. The watermark may comprise the identity of the owner and/or a copyright symbol and date, for example. This type of watermark may be considered a spatial watermark in that the data is embedded spatially in an image, and the watermark signal is distinct from the original image data. Spatial watermarks may not be robust against attacks due to the ability of filtering, removing and/or cropping the data.

Invisible watermarks do not change the image to a perceptible extent. This may be accomplished by minor changes in the least significant bits of the original data. Watermarks that are unknown to the end user may be considered steganographic.

A watermarking process may embed the data in the frequency domain, making it more robust against attack. The technique is similar to spread spectrum encoding in communications, where the data to embedded may be spread over a multitude of frequencies by modulating the watermark signal with pseudo-noise before adding it to the original data. The low signal amplitude, due to the watermark being invisible, the large bandwidth of the original data (image or video, for example), and the shortness of the watermark message, are all factors that indicate spread spectrum encoding is a logical choice.

In addition to embedding watermark in digital multimedia data, detecting whether a watermark is present may also be important in the protection of multimedia data. Multimedia players may include watermark sensing electronics to preclude the use of unauthorized or pirated media.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for watermark embedding in a multimedia system-on-chip, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for watermark embedding in a multimedia system-on-chip. Exemplary aspects of the invention include decrypting an encrypted and signed watermarking signal using a security processor integrated within the system-on-chip and embedding a watermark into a multimedia signal utilizing the decrypted watermarking signal. The watermarking signal may comprise an embedding key, a message to be embedded, and embedding parameters. The encrypted and signed watermarking signal may be received from an external memory via a host CPU within the system-on-chip or a secure server. The decrypted watermarking signal may be verified utilizing a signature, a public key and a random number generated locally. The verified watermarking signal may be stored on a non-volatile memory within the system-on-chip, or re-encrypted and re-signed before storing on a non-volatile memory that is external to the system-on-chip. The watermarking signal may be retrieved from the external non-volatile memory and re-decrypted and re-verified within the system-on-chip.

Figure 1:
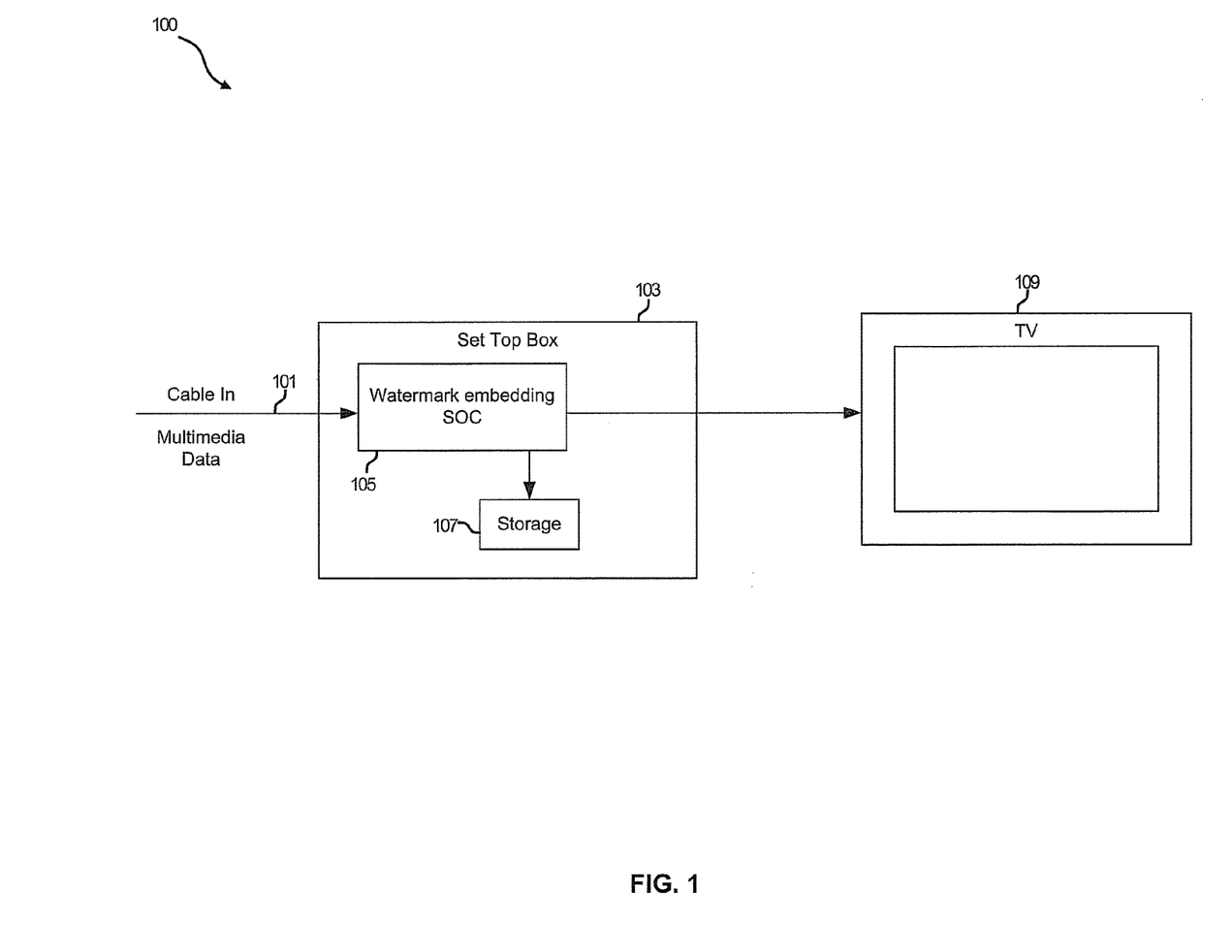
FIG. 1 is an exemplary application of system-on-chip digital watermarking, in accordance with an embodiment of the invention.

FIG. 1 is an exemplary application of system-on-chip digital watermarking, in accordance with an embodiment of the invention. Referring to FIG. 1, there is shown watermarking application 100 comprising a cable input 101, a television 109 and a set top box 103 comprising a watermark system-on-chip (SoC) 105 and a storage 107. The cable input 101 may communicate multimedia signals comprising audio, video, data and/or voice, for example. The set top box 103 may comprise suitable circuitry, logic and/or code for receiving multimedia input signals and generating an output signal that may be displayed on the television 109. The storage 107 may comprise suitable circuitry, logic and/or code for storing multimedia data received from the cable input 101 that may have been processed by the watermark SoC 105. Although a cable input 101 is shown, the invention is not so limited. Accordingly, other media inputs such as, for example, a satellite feed may be provided as an input to the set top box 103.

The watermark SoC 105 may comprise suitable circuitry, logic and/or code for receiving multimedia data from, for example, the cable input 101 and generating and embedding a digital watermark in the data. The digital watermark may comprise encrypted data regarding the source of the multimedia data and/or the recording privileges associated with the set top box 103, for example. The encrypted message in the data may only be detected with appropriate watermark detection circuitry.

In operation, multimedia data may be communicated to the set top box 103 via the cable input 101. In instances where it may be desired that the multimedia data be protected from illegal copying or use, for example, such as with copyrighted material, the watermark SoC 105 may generate a watermark to be embedded in the multimedia data before storing in the storage 107 and/or communicating to the television 109.

Watermark embedding may be considered as a function that involves the original media (content) data $\overline{V}$, an embedding key $\overline{K}$, a set of parameters $\overline{P}$ that control the embedding procedure/algorithm, and a message $\overline{M}$ that may be embedded in the video and/or audio. The message data $\overline{M}$ may be considered as a sequence of bits. The set of parameters $\overline{P}$ may contain, among other things, the so-called watermark embedding factor, i.e. a parameter that controls the amount of degradation that may be inflicted on the original media data by the watermark. The output of the watermark embedding function comprise watermarked data $\overline{W}$. Thus, the watermark embedding function may be of the following form:

$$\overline{W} = f(\overline{V}, \overline{K}, \overline{M}, \overline{P}).$$

In order to ensure secure implementation of watermark embedding, both $\overline{K}$ and $\overline{P}$ may be protected within the watermark SoC 105.

Figure 2:
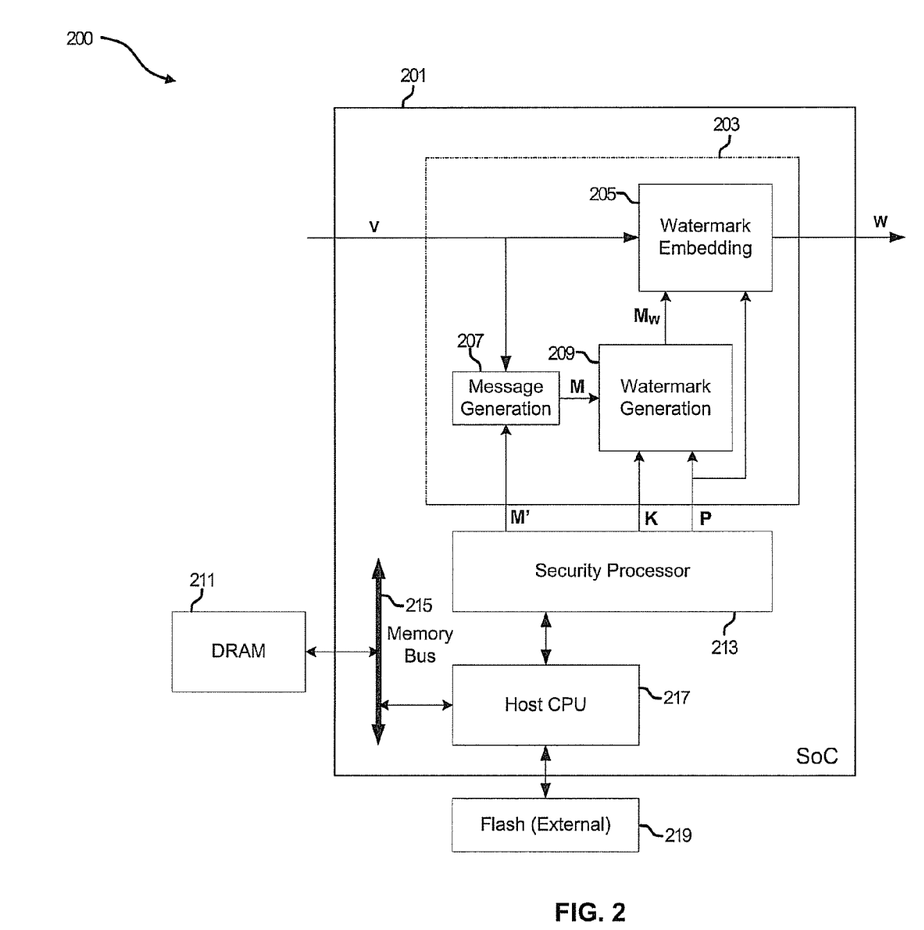
FIG. 2 is a block diagram illustrating an exemplary watermark system-on-chip, in accordance with an embodiment of the invention.

FIG. 2 is a block diagram illustrating an exemplary watermark system-on-chip, in accordance with an embodiment of the invention. Referring to FIG. 2, there is shown watermark SoC implementation 200 comprising a watermark SoC 201, a DRAM 211 and a Flash memory 219. The watermark SoC 201 may comprise a watermark embedding functional module (WEFM) 203, a security processor 213, a memory bus 215 and a host CPU 217. The WEFM 203 may comprise a watermark embedding block 205, a message generation block 207, and a watermark generation block 209. The host CPU 217 may comprise suitably circuitry, logic and/or code for fetching information required by the security processor 213 in the watermark process. The host CPU may comprise a MIPS processor, for example, and may be coupled to the DRAM 211 via the memory bus 215, and may be coupled to the flash memory 219. The memory bus 215 may comprise suitable circuitry, logic and/or code that may be enabled to communicate data, between the host CPU 217, the DRAM 211 and other components within the watermark SoC 201 that may require access to data stored on the DRAM 211.

The DRAM 211 may comprise suitable circuitry, logic and/or code for storing digital data that may be accessed by the host CPU 217 via the memory bus 215. For example, the DRAM 211 may be utilized for storing processed data generated by the host CPU 217 and/or the security processor 213. The DRAM 211 may also be utilized to store information, such as configuration information, that may be utilized to control the operation of at least one block in the watermark SoC 201. The flash memory may comprise suitable circuitry, logic and/or code for storing digital data that may be accessed by the host CPU 217. The data stored in the DRAM 211 or the flash memory 219 may comprise an encrypted message that may comprise the message $\overline{M}$ and parameters $\overline{P}$, described with respect to FIG. 1, and may be utilized by the security processor 213 in the watermark process.

The security processor 213 may comprise suitable circuitry, logic and/or code for generating output data for creating and embedding a watermark, such as the watermark 111 described with respect to FIG. 1, by the WEFM 203. In accordance with an aspect of the invention, the security processor 213 being integrated on-chip, on the watermark SoC 201, may not be susceptible to attacks that may be made on an external processor or a host CPU, such as the host CPU 217, through hardware manipulation. This substantially enhances security.

The message generation block 207 may comprise suitable circuitry, logic and/or code for generating a message $\overline{M}$ for watermark generation. The encrypted message may be received from the incoming signal, or may be retrieved by the host CPU 217 from the DRAM 211 or the flash memory 219. The watermark generation block 209 may comprise suitable circuitry, logic and/or code that may be enabled to generate the watermark $M_W$, from inputs received from the security processor 213 and the message generation block 207.

In operation, the host CPU 217 may retrieve the encrypted signed message, which may be stored on the DRAM 211 or the flash memory 219, and communicate the encrypted signed message to the security processor 213. The security processor 213 may decrypt the message and verify the signature before extracting the message M', which may be communicated to the message generator block 207. The security processor 213 may generate a key $\overline{K}$ and a set of parameters $\overline{P}$ that may be used by the watermark generation block 209 in generating the watermark signal $M_W$. The key $\overline{K}$ may be utilized to enable the watermark generation process, and the set of parameters $\overline{P}$ may be utilized to determine what algorithm may be used in the watermark generation block 209. The message generation block 209 may generate a message $\overline{M}$ from the received message M' generated by the security processor 213 or from the message data extracted from the original media data $\overline{V}$, and communicate the message $\overline{M}$ to the watermark generation block 209. The watermark generation block 209 may generate the watermark signal utilizing the input signals M', $\overline{K}$ and $\overline{P}$. The watermark signal $M_W$ and the set of parameters $\overline{P}$, may be communicated to the watermark embedding block 205. The watermark embedding block 205 may apply the watermark signal $M_W$ to the original media data $\overline{V}$ utilizing the set of parameters $\overline{P}$, which may generate an output signal $\overline{W}$ with the watermark $M_W$ embedded in the data.

The security processor 213 may securely generate and communicate the key $\overline{K}$, the messages M' and $\overline{M}$, the watermark signal $M_w$ and the set of parameters $\overline{P}$, such that the host CPU 217 or any other processor, may be unable to access these parameters directly at any time. This secure generation and communication of parameters involved in the watermarking process may be a requirement of, for example, watermarking robustness rules.

Figure 3:
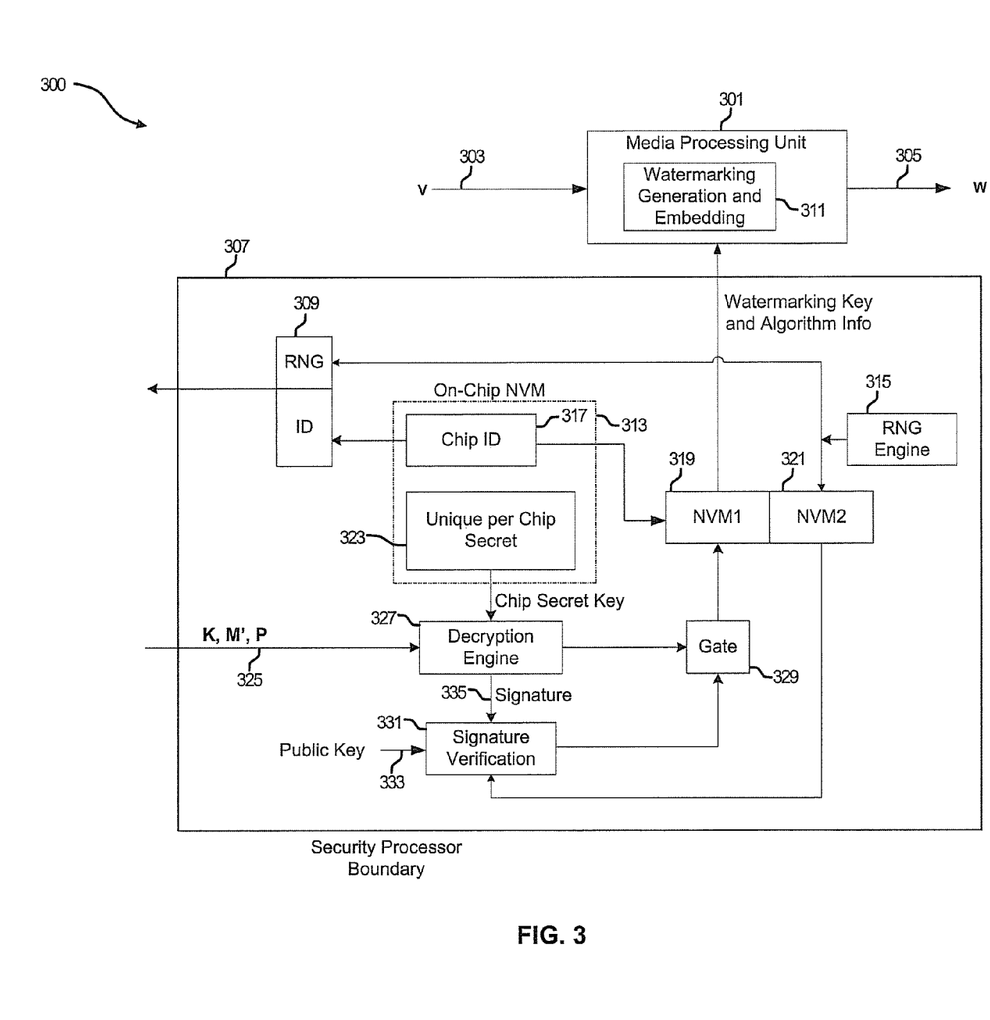
FIG. 3 is a block diagram illustrating an exemplary watermarking system utilizing a secure processor, in accordance with an embodiment of the invention.

FIG. 3 is a block diagram illustrating an exemplary watermarking system utilizing a secure processor, in accordance with an embodiment of the invention. Referring to FIG. 3, there is shown watermarking system 300 comprising a media processing unit 301 and a security processor 307. There is also shown an encrypted input signal 325, a unique per chip secret key 323, a public key 333, and a signature 335. The encrypted input signal 325 may comprise a key $\overline{K}$, a message M' to be decrypted, and a set of parameters $\overline{P}$, described with respect to FIG. 2. The security processor may comprise a register 309, an on-chip non-volatile memory (NVM) 313, a random number generation (RNG) engine 315, an NVM1 319, and NVM2 321, a decryption engine 327, a gate 329 and a signature verification block 331. The media processing unit may comprise a watermarking generation and embedding block 311.

The on-chip NVM 313 may comprise suitable circuitry, logic and/or code for storing data. The stored data may include a chip ID 317, which may be utilized to identify an individual chip that may be utilized in the watermark process, such that watermarked data generated by the chip may be utilized to identify the source of the data. The chip ID 317 may also be stored in the NVM1 319 to be included in the watermark data generated and embedded by the media processing unit 301. The data stored in the on-chip NVM 313 may also include a unique per chip secret key 323, which may be utilized by the decryption engine 327 to generate an appropriate signature 335.

The RNG engine 315 may comprise suitable circuitry, logic and/or code for generating a random number. The random number may be utilized to provide added security, since a unique combination of the random number and the chip ID 317 may only be used once. The register 309 may comprise suitable circuitry, logic and/or code for storing data. The stored data may include the chip ID 317 and a random number generated by the RNG engine 315. The on-chip NVM 313, the NVM1 319 and the NVM2 321 may comprise suitable circuitry, logic and/or code for storing data. The data stored on NVM1 319 may comprise a watermarking key and algorithm information to be utilized by the media processing unit 301. The data stored on the NVM2 321 may comprise the random number generated by the RNG engine 315, which may be accessed by the signature verification block 331.

The decryption engine 327 may comprise suitable circuitry, logic and/ or code that may be enabled to decrypt the encrypted input signal 325 comprising K, M' and P utilizing a unique per chip secret key 323 received from the on-chip NVM 313. The output of the decryption engine 327 may be coupled to an input of the signature verification block 331 and the gate 329. The signature verification block 331 may comprise suitable circuitry, logic and/or code that may be enabled to verify the validity of signatures received as inputs. The output of the signature verification block 331 may be coupled to an input of the gate 329. The signature verification block 331 may receive, as inputs, the public key 333, the signature 335 and/or the random number generated by the RNG engine 315 and stored in the NVM2 321. The gate 329 may comprise suitable circuitry, logic and/or code that may be enabled to allow or disallow the watermarking process to proceed depending on the verification of the public key 333 and the signature 335 in the signature verification block 331.

In operation, the encrypted input signal 325 that may comprise the key $\overline{K}$, the message M' to be decrypted, and the set of parameters $\overline{P}$ defining the embedding process and algorithm to be used by the media processing unit 301, may be communicated to an input of the decryption engine 327. The unique per chip secret key 323 may be communicated to another input of the decryption engine 327, which may generate a signature 335 that may be communicated to the signature verification block 331. The signature verification block 331 may verify the received signature and the public key 333 stored within the security processor 307 and the random number stored in the NVM2 321, and if verified, or passed, may communicate a signal to the gate 329 to store the decrypted message and set of parameters to the NVM1 319. If the verification fails, the process may stop.

The media processing unit 301 may access the data stored in the NVM1 319 to determine the watermark generating and embedding block 311 parameters to be utilized in the process and the data to be embedded, which may comprise the algorithm, the watermarking key, the watermark $M_w$, and the chip ID, for example. The watermark generating and embedding block 311 may embed the watermark $M_w$ into the original media data $\overline{V}$ 303 to generate an output signal $\overline{W}$ 305.

The security processor 307 may securely generate and communicate the key $\overline{K}$, the messages M' and $\overline{M}$, the watermark signal $M_w$ and the set of parameters $\overline{P}$, so that a host CPU or any other processor, may be unable to access these parameters directly at any time. This secure generation and communication of parameters involved in the watermarking process may be a requirement of, for example, watermarking robustness rules.

Figure 4A:
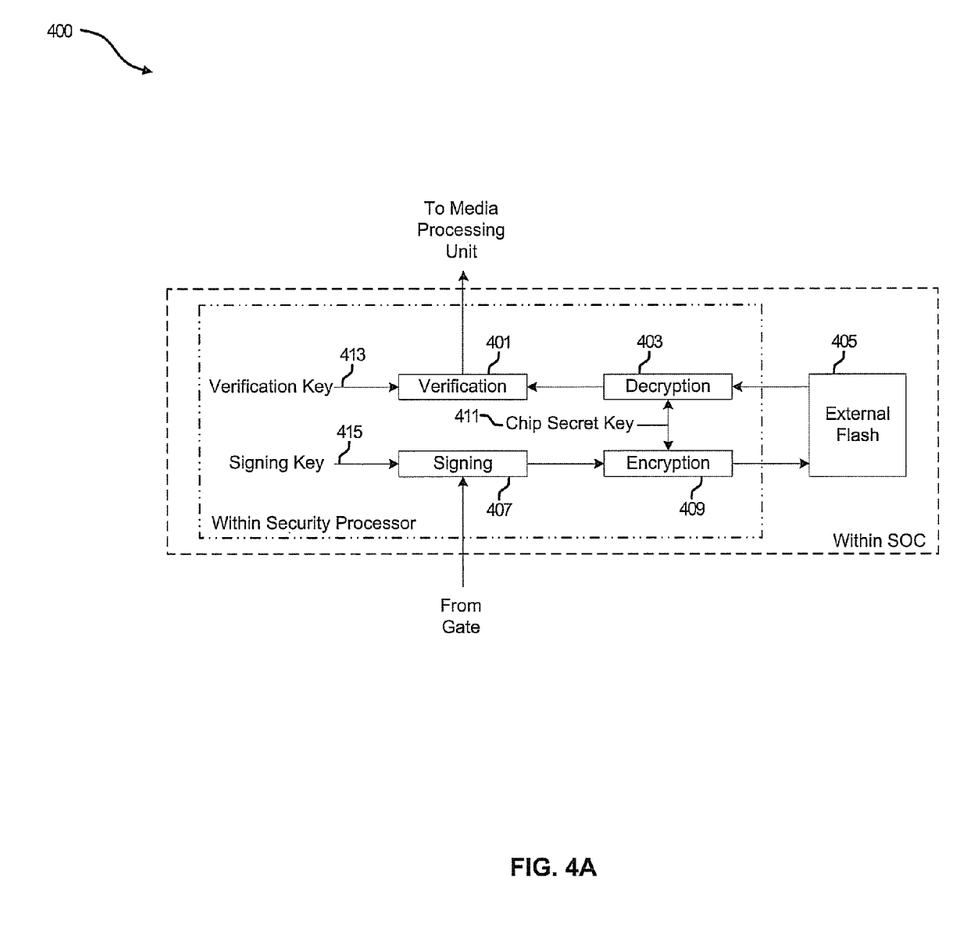
FIG. 4A is a block diagram of an exemplary external flash watermarking and algorithm information storage, in accordance with an embodiment of the invention.

FIG. 4A is a block diagram of an exemplary external flash watermarking and algorithm information storage, in accordance with an embodiment of the invention. Referring to FIG. 4A, there is shown external flash storage system 400 comprising a verification block 401, a decryption block 403, a flash memory 405, a signing block 407 and an encryption block 409. There is also shown a chip secret key 411, a verification key 413 and a signing key 415. The external flash storage system 400 may be utilized to replace the NVM1 319 described with respect to FIG. 3, in instances where no non-volatile memory is available, and may be enabled to store the watermarking key and algorithm information required by the watermarking generation and embedding block 311, described with respect to FIG. 3.

The verification block 401, the decryption block 403, the signing block 407 and the encryption block 409 may be located within the security processor 307, described with respect to FIG. 3, and the flash memory 405 may be located external to the security processor 307, but within the SoC 201 described with respect to FIG. 2. The flash memory 405 may be substantially similar to the flash memory 219 described with respect to FIG. 2.

The signing block 407 may comprise suitable circuitry, logic and/or code that may be enabled to receive inputs from the gate 329, described with respect to FIG. 3, which may comprise decrypted data generated by the decryption engine 327, described with respect to FIG. 3. The signing block 407 may also receive as an input the signing key 415 which may be included, or signed, onto the data communicated to the encryption block 409 to indicate that the request for data from the flash memory 405 is from a secure source, namely the secure processor 307, described with respect to FIG. 3. The encryption block 409 may comprise suitable circuitry, logic and/or code that may be enabled to encrypt data to be stored in the flash memory 405. The encryption block 409 may receive as inputs the signal generated by the signing block 407 and the chip secret key 411, which may be substantially similar to the unique per chip secret 323 described with respect to FIG. 3

The decryption block 403 may comprise suitable circuitry, logic and/or code that may be enabled to decrypt the encrypted data stored on the flash memory 405 and generate an output signal that may be communicated to the verification block 401. The decryption block 403 may receive as inputs the encrypted data stored in the flash memory 405 and the chip secret key 411. The verification block 401 may comprise suitable circuitry, logic and/or code that may be enabled to compare an input received from the decryption block 403 with the verification key 413 to determine whether data may be communicated to the media processing unit 301, described with respect to FIG. 3.

In operation, the external flash storage system 400 may be utilized to securely store encrypted data in an external flash memory 405 in instances when a non-volatile memory may not be available within the security processor 307 described with respect to FIG. 3. An input signal generated by the gate 329, described with respect to FIG. 3, may be received by the signing block 407. The signing key 415 may be inserted into the data received from the input signal. The encryption block 409 may insert the chip secret key 411 and encrypt the data for storage on the external flash memory 405. In this manner, data may be stored on external storage while still maintaining the security of the security processor 307, described with respect to FIG. 3.

The encrypted data stored on the flash memory 405 may be decrypted by the decryption block if the appropriate chip secret key 411 may also be received as an input. The decrypted data may then be communicated to the verification block 401. In instances where the decrypted data may be verified by the verification key 413, the data may be communicated to the media processing unit 301, described with respect to FIG. 3.

Figure 4B:
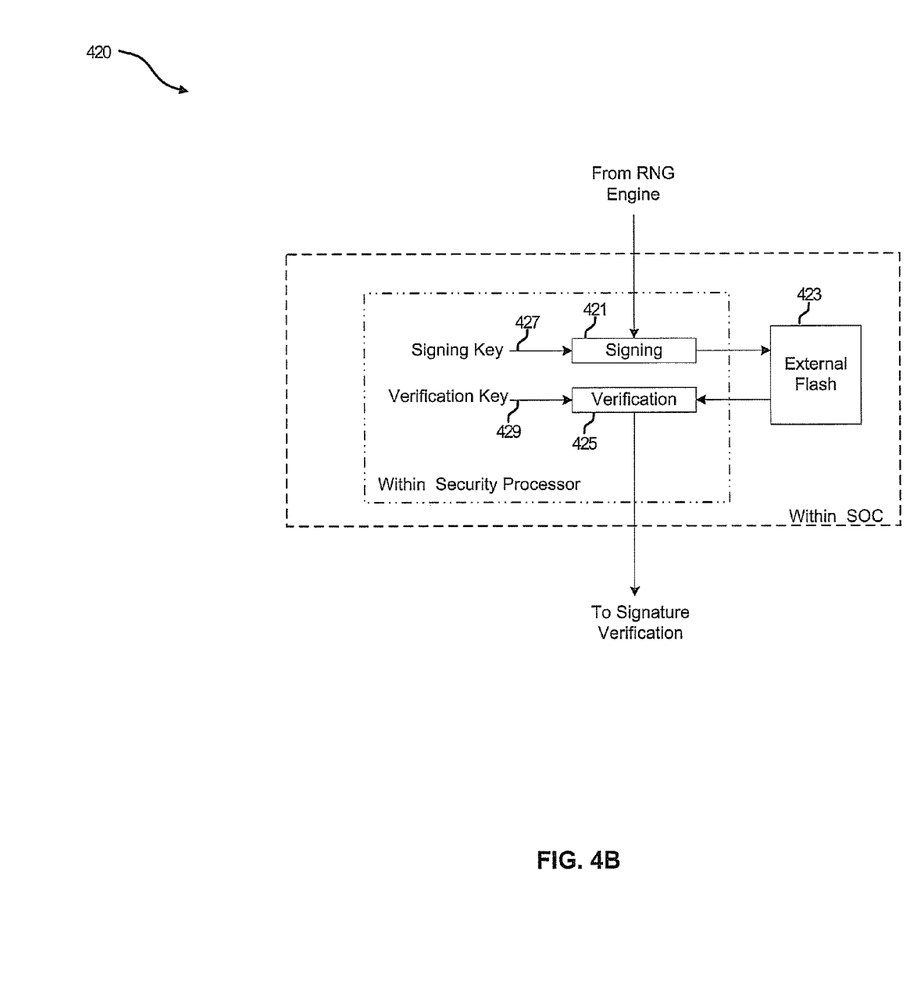
FIG. 4B is a block diagram of an exemplary random number storage, in accordance with an embodiment of the invention.

FIG. 4B is a block diagram of an exemplary random number storage, in accordance with an embodiment of the invention. Referring to FIG. 4B, there is shown external flash random number storage system 420 comprising a signing block 421, a flash memory 423, a verification block 425, a signing key 427 and a verification key 429. The signing block 421, the verification block 425, the signing key 427 and the verification key 429 may be internal to the security processor 307, described with respect to FIG. 3, and the flash memory 423 may be external to the security processor 307, but within the watermark SoC 201 described with respect to FIG. 2. The signing block 421, the verification block 425, the flash memory 423, the signing key 427 and the verification key 429 may be substantially similar to the signing block 407, the verification block 425, the flash memory 405, the signing key 415 and the verification key 413 described with respect to FIG. 4A. The flash memory 423 may be enabled to store the random number generated by the RNG engine 315, described with respect to FIG. 3. The flash memory 423 may also store the chip ID stored in the register 309 described with respect to FIG. 3.

In operation, the signal generated by the RNG engine 315 may be received by the signing block 421. The signing block may also receive as an input the signing key 427. The data including the random number generated by the RNG engine 315 and the signature derived from the signing key 427 may be stored on the flash memory 423. The data stored on the flash memory 423 may be communicated to the verification block 425. If the data communicated from the verification block 425 is verified by the verification key 429, the data may be communicated to the signature verification block 331, described with respect to FIG. 3

Figure 5:
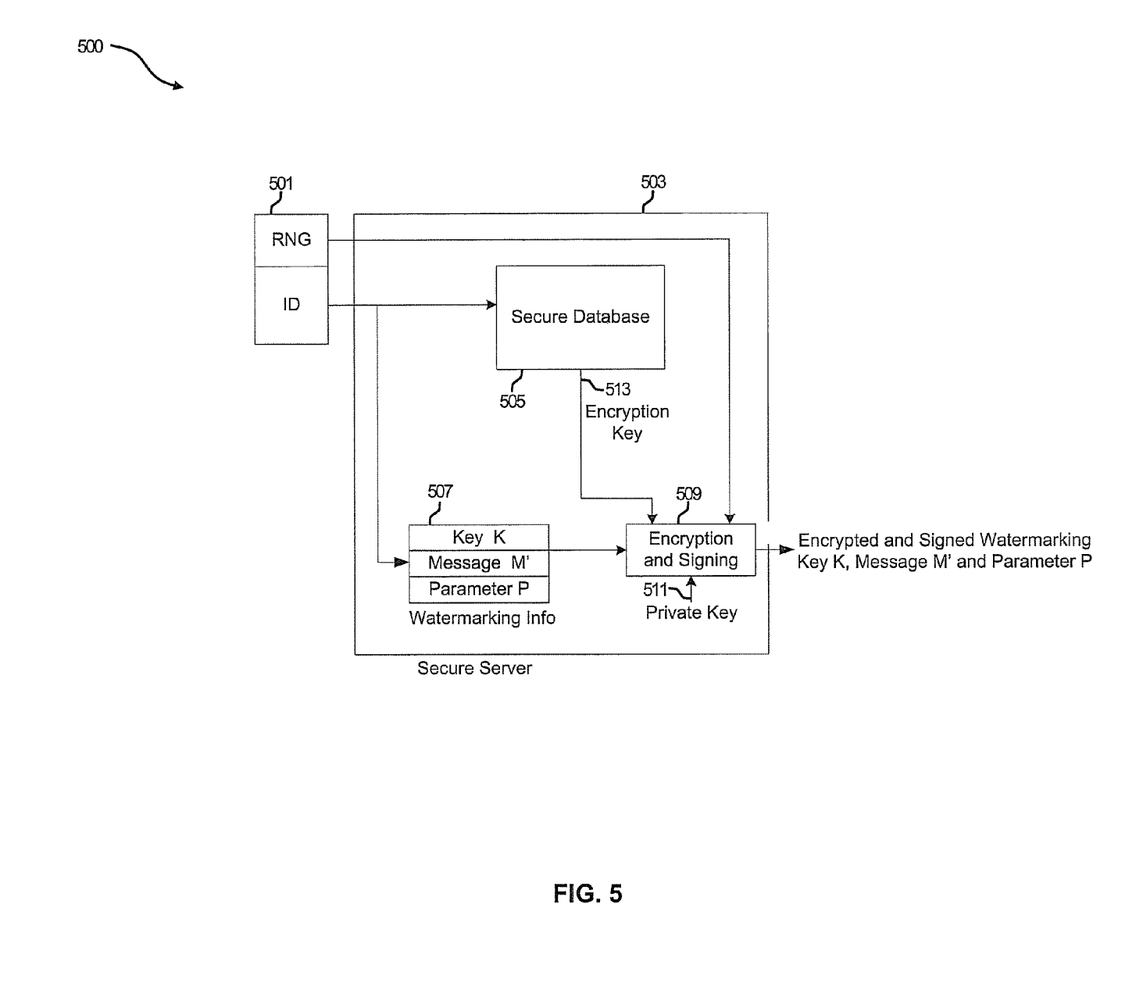
FIG. 5 is a block diagram of an exemplary server side encrypted message generation, in accordance with an embodiment of the invention.

FIG. 5 is a block diagram of an exemplary server side encrypted message generation, in accordance with an embodiment of the invention. Referring to FIG. 5 there is shown encrypted message generator 500 comprising a secure server 503 and a register 501. The secure server 503 may comprise a secure database 505, a watermarking information block 507, an encryption and signing block 509, a private key 511 and an encryption key 513. The register 501 may be substantially similar to register 309 described with respect to FIG. 3, and may be enabled to store the random number generated by the RING engine 315 and the chip ID 317, also described with respect to FIG. 3.

The secure database 505 may comprise suitable circuitry, logic and/or code that may be enabled to store data without allowing read access from outside the secure server 503. Data stored in the secure database 505 may comprise a plurality of secret encryption keys, such as the encryption key 513, defined for a plurality of chip IDs corresponding to a plurality of watermark SoCs, such as the watermark SoC 201 described with respect to FIG. 2. The watermark info block 507 may comprise the embedding key $\overline{K}$, the message M' and the set of parameters $\overline{P}$, described with respect to FIG. 1. The message M' may also comprise the chip ID 317 stored in the register 501 and read by the secure server 503. The encryption and signing block 509 may comprise suitable circuitry, logic and/or code that may be enabled to encrypt data and provide a signature to the encrypted data. The encryption and signing block 509 may receive as inputs the encryption key 513, the private key 511 and the watermark information comprising the embedding key $\overline{K}$, the message M' and the set of parameters $\overline{P}$, and generate an output comprising the encrypted and signed watermarking key $\overline{K}$, the message M' and the set of parameters $\overline{P}$.

In operation, a chip ID, such as the chip ID 317 described with respect to FIG. 3, may be utilized to retrieve an encryption key 513 from the secure database 505. The encryption key 513 and the private key 511 may be utilized by the encryption and signing block 509 to encrypt and sign the watermark information comprising the embedding key $\overline{K}$, the message M' and the set of parameters $\overline{P}$ from the watermark information block 507. The output generated by the encryption and signing block 509 may be communicated over a network to a remote host, or stored externally for use by a watermark SoC, such as the watermark SoC 201 described with respect to FIG. 2.

Figure 6:
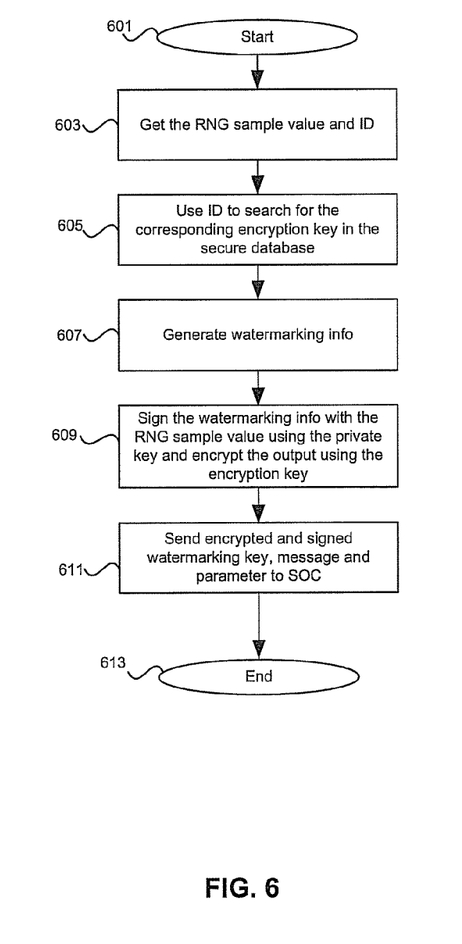
FIG. 6 is a flow diagram illustrating exemplary steps that may occur on the server side of the watermarking generation process, in accordance with an embodiment of the invention.

FIG. 6 is a flow diagram illustrating exemplary steps that may occur on the server side of the watermarking generation process, in accordance with an embodiment of the invention. Referring to FIG. 6, after start step 601 in step 603, the random number generated by the RNG engine 315 and the chip ID 317 may be retrieved by the secure server 503. In step 605, the chip ID 317 may be utilized to retrieve a corresponding encryption key 513. In step 607, the watermarking information may be generated, which may also include the chip ID 317. In step 609, the watermarking information may be signed with the random number from the RNG engine 315 using the private key 511, and then encrypted by the encryption and signing block 509 utilizing the encryption key 513. In step 611, the output of the encryption and signing block 509 comprising the encrypted and signed embedding key $\overline{K}$, the message M' and the set of parameters $\overline{P}$ to the SoC 201.

Figure 7:
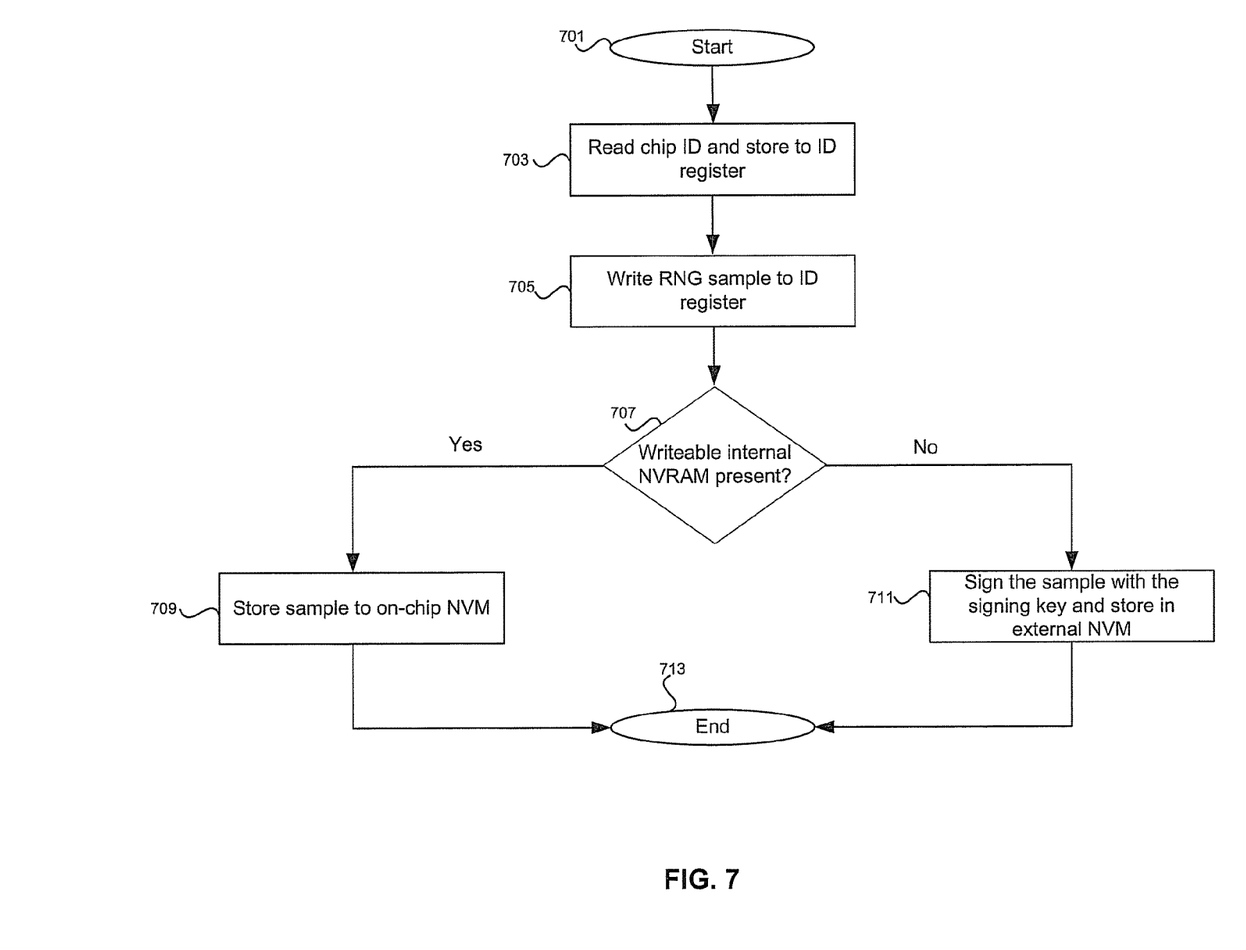
FIG. 7 is a flow diagram illustrating exemplary steps that may occur on the system-on-chip side of the watermark generation process, in accordance with an embodiment of the invention.

FIG. 7 is a flow diagram illustrating exemplary steps that may occur on the system-on-chip side of the watermark generation process, in accordance with an embodiment of the invention. Referring to FIG. 7, after start step 701 in step 703, the chip ID 317 may be read from the on-chip NVM 313 and stored in the register 309. In step 705, the random number generated by the RNG engine 315 may be stored in the register 309. In step 707, in instances where an on-chip writeable non-volatile memory, such as NVM2 321, the random number may be stored in the NVM2 321, followed by end step 713. In instances where no on-chip writeable non-volatile memory may be present, the random number may be signed with the signing key 427 and stored in an external memory, such as the flash memory 423, followed by end step 713.

Figure 8:
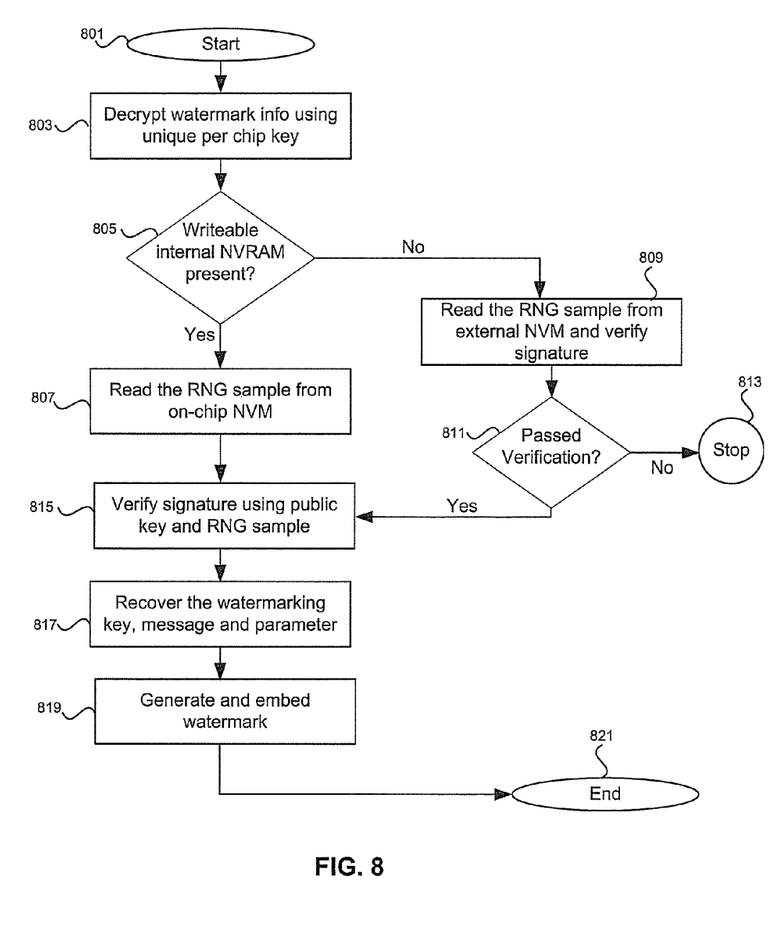
FIG. 8 is a flow diagram illustrating exemplary steps that may occur on the system-on-chip side of the watermark embedding process, in accordance with an embodiment of the invention.

FIG. 8 is a flow diagram illustrating exemplary steps that may occur on the system-on-chip side of the watermark embedding process, in accordance with an embodiment of the invention. Referring to FIG. 8, after start step 801 in step 803, the encrypted input signal 325 may be decrypted by the decryption engine 327 using the unique per chip secret key 323. In step 805, if a writeable internal non-volatile memory may be present, such as the NVM2 321, the random number generated by the RNG engine 315 may be read from the NVM2 321. In step 815, the signature 335 may be verified by the signature verification block 331 utilizing the public key 333 and the random number generated by the RNG engine 315. If, in step 805, a writeable internal non-volatile memory may not be present, the random number stored in the flash memory 423 may be read and utilized by the signature verification block 331 to verify the signature 335 utilizing the public key 333. In step 811, if the verification of the signature 335 passes, the process may proceed to step 815, but if the verification fails, the process stops in step 813. In step 817, the decrypted embedding key $\overline{K}$, the message M' and the set of parameters $\overline{P}$ may be stored in the NVM1 319 and communicated to the watermarking generation and embedding block 311. In step 819, the watermarking generation and embedding block 311 may generate and embed the watermark $M_W$ into the original media data $\overline{V}$ 303 to generate an output signal $\overline{W}$ 305, followed by end step 821.

In an embodiment of the invention, a security processor 307 integrated within a system-on-chip 201 may decrypt an encrypted and signed watermarking signal for embedding a watermark into a multimedia signal utilizing the decrypted watermarking signal $M_W$, which may comprise an embedding key $\overline{K}$, a message M' to be embedded, and a set of embedding parameters $\overline{P}$. The encrypted and signed watermarking signal may be received from an external memory 219 via a host CPU 217 within the system-on-chip 201 or a secure server 503. The decrypted watermarking signal may be verified utilizing a signature 335, a public, key 333 and a random number generated locally. The verified watermarking signal may be stored on a non-volatile memory 319 within the system-on-chip 201, or re-encrypted and re-signed before storing on a non-volatile memory 405 that is external to the system-on-chip 201. The watermarking signal may be retrieved from the external non-volatile memory 405 and re-decrypted and re-verified within the system-on-chip 201.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system, comprising:
   one or more circuits for use in a secure server, said one or more circuits being configured to generate an encrypted and signed watermarking signal to be decrypted by a particular system-on-chip, wherein said encrypted and signed watermarking signal is generated based on an encryption key that is retrieved from a secure database by using a unique chip ID associated with said particular system-on-chip.

2. The system according to claim 1, wherein said one or more circuits are further configured to sign, within said secure server, said watermarking signal with a signature based on a private key.

3. The system according to claim 2, wherein said one or more circuits are further configured to sign said watermarking signal utilizing a random number generated in said particular system-on-chip.

4. The system according to claim 1, wherein said one or more circuits are further configured to encrypt, within said secure server, said watermarking signal based on a secret encryption key associated with said particular system-on-chip.

5. The system according to claim 4, wherein said one or more circuits are further configured to determine said secret encryption key based on said unique chip ID associated with said particular system-on-chip.

6. The system according to claim 1, wherein said one or more circuits are further configured to store information received from said particular system-on-chip for use during said generation of said encrypted and signed watermarking signal.

7. The system according to claim 4, wherein said information received from said particular system-on-chip comprises said unique chip ID or a random number generated in said particular system-on-chip.

8. The system according to claim 1, wherein said one or more circuits are further configured to communicate or store said encrypted and signed watermarking signal to facilitate subsequent use by said particular system-on-chip.

9. The system according to claim 1, wherein said encrypted and signed watermarking signal comprises an embedding key, a message to be embedded, and parameters defining said embedding.

10. The system according to claim 9, wherein said embedding key is utilized for said embedding of said watermark during use of said message.

11. A method, comprising:
generating in a secure server, an encrypted and signed watermarking signal to be decrypted by a particular system-on-chip, wherein said encrypted and signed watermarking signal is generated based on an encryption key that is retrieved from a secure database by using a unique chip ID associated with said particular system-on-chip.

12. The method according to claim 11, further comprising signing, within said secure server, said watermarking signal with a signature based on a private key.

13. The method according to claim 12, further comprising signing said watermarking signal utilizing a random number generated in said particular system-on-chip.

14. The method according to claim 11, further comprising encrypting, within said secure server, said watermarking signal based on a secret encryption key associated with said particular system-on-chip.

15. The method according to claim 14, further comprising determining said secret encryption key based on said unique chip ID associated with said particular system-on-chip.

16. The method according to claim 11, further comprising storing information received from said particular system-on-chip for use during said generation of said encrypted and signed watermarking signal.

17. The method according to claim 16, wherein said information received from said particular system-on-chip comprises said unique chip ID or a random number generated in said particular system-on-chip.

18. The method according to claim 11, further comprising communicating or storing said encrypted and signed watermarking signal to facilitate subsequent use by said particular system-on-chip.

19. The method according to claim 11, wherein said encrypted and signed watermarking signal comprises an embedding key, a message to be embedded, and parameters defining said embedding.

20. The method according to claim 19, wherein said embedding key is utilized for said embedding of said watermark during use of said message.

* * * * *

UNITED STATES PATENT AND TRADEMARK OFFICE
CERTIFICATE OF CORRECTION

| | |
|---|---|
| PATENT NO. | : 8,965,036 B2 |
| APPLICATION NO. | : 13/196055 |
| DATED | : February 24, 2015 |
| INVENTOR(S) | : Xeumin Chen |

It is certified that error appears in the above-identified patent and that said Letters Patent is hereby corrected as shown below:

In the Claims

Column 10, line 54, please replace "systern-on-chip" with --system on chip--.

Signed and Sealed this
Second Day of June, 2015

Michelle K. Lee
*Director of the United States Patent and Trademark Office*